United States Patent
Stemmer et al.

(10) Patent No.: US 11,048,494 B2
(45) Date of Patent: Jun. 29, 2021

(54) ARRANGEMENT AND METHOD FOR UPDATING A CONTROL SOFTWARE IN A HIGH-VOLTAGE CONTROL UNIT

(71) Applicant: Hanon Systems, Daejeon (KR)

(72) Inventors: Andrej Stemmer, Bonn (DE); Gregor Sanzen, Insul (DE); Mario Lenz, Kerpen (DE)

(73) Assignee: Hanon Systems, Daejeon (KR)

(*) Notice: Subject to any disclaimer, the term of this patent is extended or adjusted under 35 U.S.C. 154(b) by 367 days.

(21) Appl. No.: 15/937,405

(22) Filed: Mar. 27, 2018

(65) Prior Publication Data
US 2018/0293062 A1 Oct. 11, 2018

(30) Foreign Application Priority Data
Apr. 5, 2017 (DE) .......................... 102017107277.2

(51) Int. Cl.
*G06F 8/65* (2018.01)
*G06F 11/10* (2006.01)
(Continued)

(52) U.S. Cl.
CPC .............. *G06F 8/65* (2013.01); *G06F 8/656* (2018.02); *G06F 9/4451* (2013.01);
(Continued)

(58) Field of Classification Search
CPC ............ G06F 8/60–71; G06F 9/4451; G06F 11/1004; G06F 11/1433; G06F 13/4022;
(Continued)

(56) References Cited

U.S. PATENT DOCUMENTS 7,870,379 B2 * 1/2011 Krieger .................... G06F 1/26
713/100
7,872,774 B2 * 1/2011 Okamoto ........... G03G 15/5004
358/1.16
(Continued)

FOREIGN PATENT DOCUMENTS

CN 101689814 3/2010
JP 2006-195766 7/2006
(Continued)

OTHER PUBLICATIONS

Andrei, G. R., et al., On the communication network inside vehicles, 7th International Conference on Electronics, Computers and Artificial Intelligence (ECAI), Jun. 25-27, 2015, 6 pages, [retrieved on Apr. 2, 21], Retrieved from the Internet: <URL:http://ieeexplore.IEEE.org/>.*
(Continued)

*Primary Examiner* — Geoffrey R St Leger
(74) *Attorney, Agent, or Firm* — Norton Rose Fulbright US LLP; James R. Crawford

(57) ABSTRACT

An arrangement and a method for updating a control software in a high-voltage control device, has as its objective to specify a solution with which an update of the control software, independently of a current operational state of the high-voltage region of the high-voltage control device, is enabled for the low voltage region as well as also the high-voltage region of the high-voltage control device.

8 Claims, 4 Drawing Sheets

Figure 1:
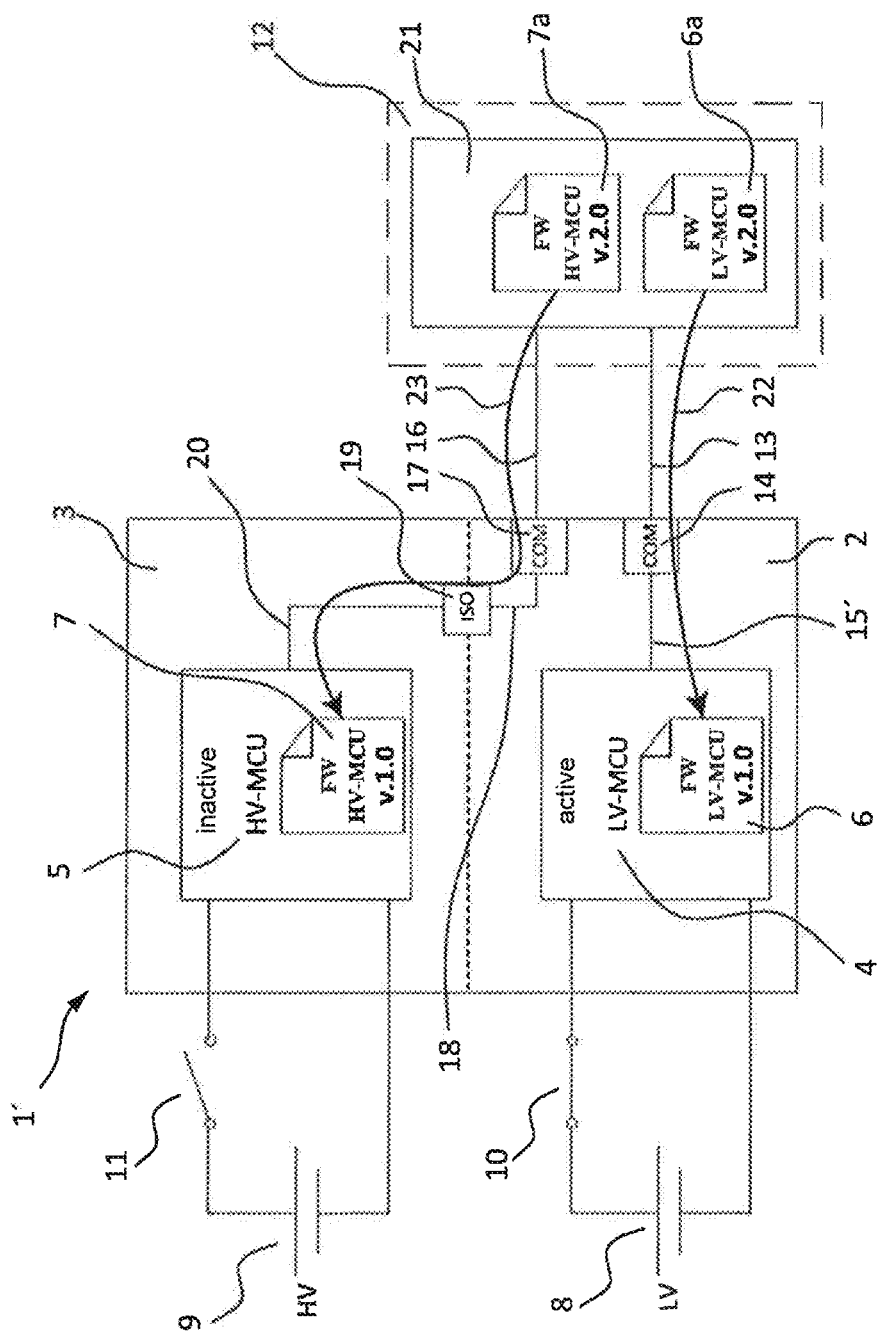

(51) Int. Cl.
   *G06F 13/40*    (2006.01)
   *G06F 11/14*    (2006.01)
   *G06F 8/656*    (2018.01)
   *G06F 9/445*    (2018.01)
   *H04L 12/40*    (2006.01)

(52) U.S. Cl.
   CPC ...... *G06F 11/1004* (2013.01); *G06F 11/1433* (2013.01); *G06F 13/4022* (2013.01); *G06F 2213/0002* (2013.01); *G06F 2213/0042* (2013.01); *H04L 2012/40215* (2013.01)

(58) Field of Classification Search
   CPC ..... G06F 2213/0002; G06F 2213/0042; H04L 2012/40273
   USPC .................................................. 717/168–178
   See application file for complete search history.

(56) References Cited

U.S. PATENT DOCUMENTS

| | | | | |
|---|---|---|---|---|
| 8,174,153 | B2* | 5/2012 | Bird-Radolovic | H04L 25/0266 307/326 |
| 8,255,898 | B2* | 8/2012 | Nakano | G06F 8/65 717/171 |
| 10,503,668 | B2* | 12/2019 | Kumar KN | G06F 8/654 |
| 2007/0236734 | A1* | 10/2007 | Okamoto | H04N 1/00885 358/1.16 |
| 2008/0086652 | A1* | 4/2008 | Krieger | G06F 1/26 713/330 |
| 2009/0184760 | A1 | 7/2009 | Hauenstein | |
| 2010/0133921 | A1* | 6/2010 | Bird-Radolovic | H04L 12/40032 307/326 |
| 2014/0028468 | A1 | 1/2014 | Grady et al. | |
| 2018/0107609 | A1* | 4/2018 | Kumar KN | G06F 13/20 |

FOREIGN PATENT DOCUMENTS

| | | |
|---|---|---|
| JP | 2016060388 A | 4/2016 |
| JP | 2016112909 A | 6/2016 |

OTHER PUBLICATIONS

Mansor, H., et al., Don't Brick Your Car: Firmware Confidentiality and Rollback for Vehicles, 10th International Conference on Availability, Reliability and Security, Aug. 24-27, 2015, pp. 139-148, [retrieved on Apr. 2, 21], Retrieved from the Internet: <URL:http://ieeexplore.IEEE.org/>.*

* cited by examiner

ARRANGEMENT AND METHOD FOR UPDATING A CONTROL SOFTWARE IN A HIGH-VOLTAGE CONTROL UNIT

CROSS REFERENCE TO RELATED APPLICATIONS

This application claims priority from German Patent Application No. 102017107277.2 filed Apr. 5, 2017, which is hereby incorporated by reference in its entirety.

The invention relates to an arrangement for updating a control software in a high-voltage control device. The high-voltage control device comprises an LV region with a first control configuration and a high-voltage region with a second control configuration. The first control configuration is connected across a first internal communication line to a first communication interface. For the update of the control software of the high-voltage control device an external unit is connected to the first communication interface across a first communication line.

The invention also relates to a method for the update of a control software in a high-voltage control device wherein, for the update of the control software for a first control configuration, a new first control software is provided and for the update of the control software for a second control configuration a new second control software is provided. The new control software is herein transmitted into memory areas of the control configurations.

High-voltage control devices, for example high-voltage inverters, which are utilized in electrical air-conditioning compressors, can be operated stationarily as well as also in motor vehicles. These high-voltage control devices conventionally have a central control unit, for example an electronic control unit, abbreviated ECU, at their disposal. Within this ECU there is most frequently a microcontroller, abbreviated MCU, which is controlled by means of a control software and therewith enables the correct operation of the high-voltage inverter.

This description deals in particular with the updating of the control software controlling the microcontroller in such high-voltage control devices or high-voltage inverters.

Pre-known in prior art are high-voltage control devices, for example for electric motor vehicles or hybrid motor vehicles, which include two regions that are controllable independently of one another. The regions, also referred to as high-voltage region, abbreviated HV region, and low-voltage region, abbreviated LV region, must be implemented such that they are galvanically isolated from one another.

State of the art defines so-called voltage levels, for example for electric or hybrid vehicles, such that the term 'low voltage' or 'low-voltage region' (LV) comprises alternating voltages ≤30 V and direct voltages ≤60 V, wherein the term 'high-voltage' or 'high-voltage region' (HV) is applied to alternating [AC] voltages greater than 30 V and to direct [DC] voltages greater than 60 V.

Since galvanically isolated circuit paths between the HV region and the LV region are cost-intensive, each of the regions includes a separate control unit with its own microcontroller to which in each case an associated control software is assigned for the control of the operating sequence. Such control software is frequently also referred to as firmware.

Consequently, both microcontrollers are also galvanically isolated from one another and, under the control of their associated firmware, can operate independently of one another in their particular region.

The voltage supplies of the HV region and of the LV region, for example in a motor vehicle, are conventionally controlled independently of one another and by a separate battery control device each.

To improve the energy consumption or to attain safe electrical conditions of the circuit configuration of the HV region, shutting down the power supply, for example, of the HV region is also provided. Such a shut-off of the power supply can be carried out through a control means, such as a battery control device, automatically or by an operator or the maintenance personnel manually before an intervention into the high-voltage control device. Therewith, the permanent power supply of the HV region is not assured.

In such case in which the power supply for the HV region is switched off, a communication connection cannot be established between an external unit and the control unit of the HV region. The communication with the control unit of the HV region, for example for any update of the control software, also referred to as firmware update, cannot take place or is interrupted by the shut-off of the HV region.

In this operational state in which the HV region is switched off and the LV region is switched on, only updating the control software of the HV region can consequently be carried out. In addition to the update of the control software, most frequently a diagnosis of the HV region as well as a readout of stored data from the HV region is often also not possible.

There is therefore a need for a solution which enables the updating of the control software of the control configurations of the HV region and of the LV region independently of the status of the HV region.

The objective of the invention comprises specifying an arrangement and a method for updating the control software in a high-voltage control device with which, independently of the current operational status of the HV region of the high-voltage control device, updating the control software for the LV region as well as also for the HV region of the high-voltage control device is enabled.

This task is resolved through a subject matter with the characteristics of the arrangement described herein.

The task is also resolved through a method with the characteristics described herein.

The invention provides connecting the first control configuration of the LV region with the second control configuration of the HV region internally with one another, i.e. within the high-voltage control device, across the particular communication interfaces of the control configuration and in this way enable a data exchange between the first control configuration and the second control configuration. To ensure the galvanic isolation, or decoupling, between the LV region and the HV region, the connection of the communication interfaces of the control configurations takes place across a configuration for the galvanic isolation which comprises the appropriate means for the isolation or the decoupling. Such means are also referred to as isolator, isolator configuration or coupling element, wherein, with the aid of which, signals can be transmitted galvanically isolated. Prior art proposes in this regard inductive, capacitive and other isolation capabilities, for example using optocouplers.

It is furthermore provided that the extent of functions of the first control configuration is expanded by an algorithm which allows, when carrying out an update of the first control software of the first control configuration, also storing the data for an update of the second control software of the second control configuration in a memory area of the first control configuration.

Moreover, the extent of the function of the first control configuration and of the second control configuration is expanded by a further algorithm which, as soon as the HV region is active or switched on, enables automatically carrying out an update of the second control software of the second control configuration using the data stored in the memory area of the first control configuration. In the case in which the second switch connects the HV region with the HV power supply and the HV region is connected in, the further algorithm detects this switched-on state of both control configurations, establishes across the particular communication interfaces of the control configurations an internal communication connection and transmits to the second control configuration the data, stored in a memory area of the first control configuration, for updating the second control software of the second control configuration. The transmitted data are stored in an appropriate memory area in this second control configuration.

This expansion of the functionality of the high-voltage control device enables the completion of an update of the first control software and of the second control software independently of the operational status of the HV region. In particular when carrying out maintenance work in which, for reasons of safety of the maintenance personnel, the HV region is switched off, there is consequently the feasibility of carrying out an update of the firmware of the high-voltage control device.

An additional advantage of the present solution comprises that, for an update of the second control software of the second control configuration, no external unit has to be connected to the HV region across a communication line. The electrical safety for the involved devices and for the personnel carrying out the procedure is hereby improved.

It is additionally also provided that the first communication interface comprises a terminal for a serial bus for the connection to the external unit. For this purpose for the coupling can be utilized bus systems of known prior art, such as USB interfaces, or "Universal Serial Bus", RS232 interfaces or CAN-BUS interfaces, or "Controller Area Network".

Alternatively, another terminal can also be provided for coupling the first communication interface with an external unit across any chosen bus system, for example a parallel bus.

Figure 2A:
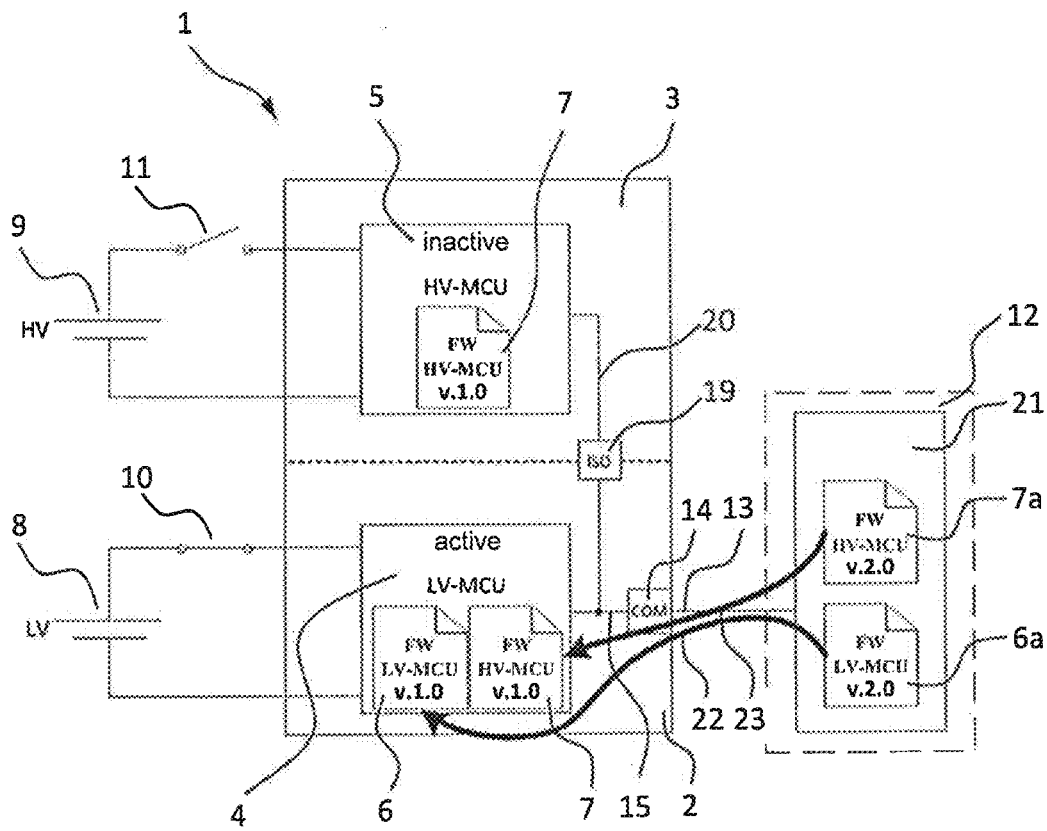
Figure 2B:
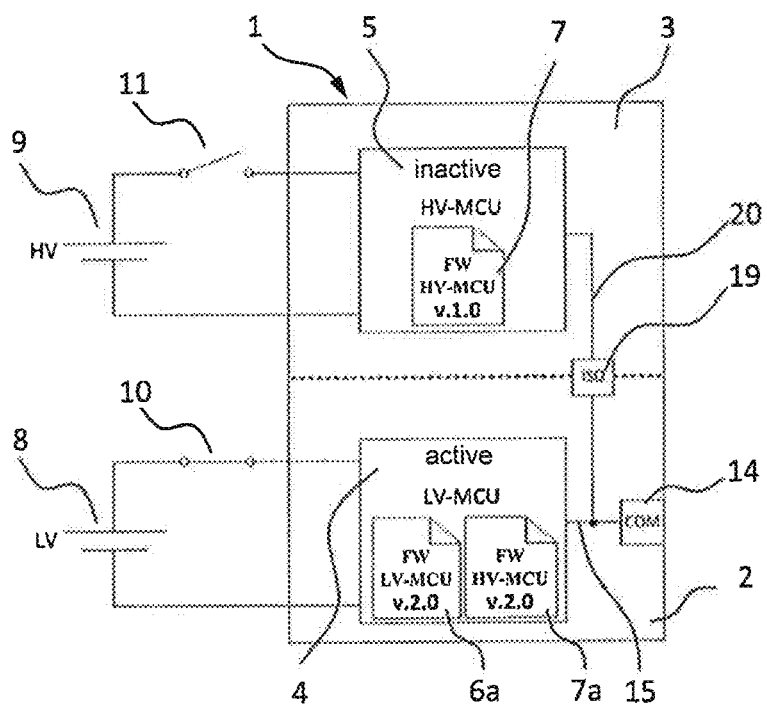
Figure 2C:
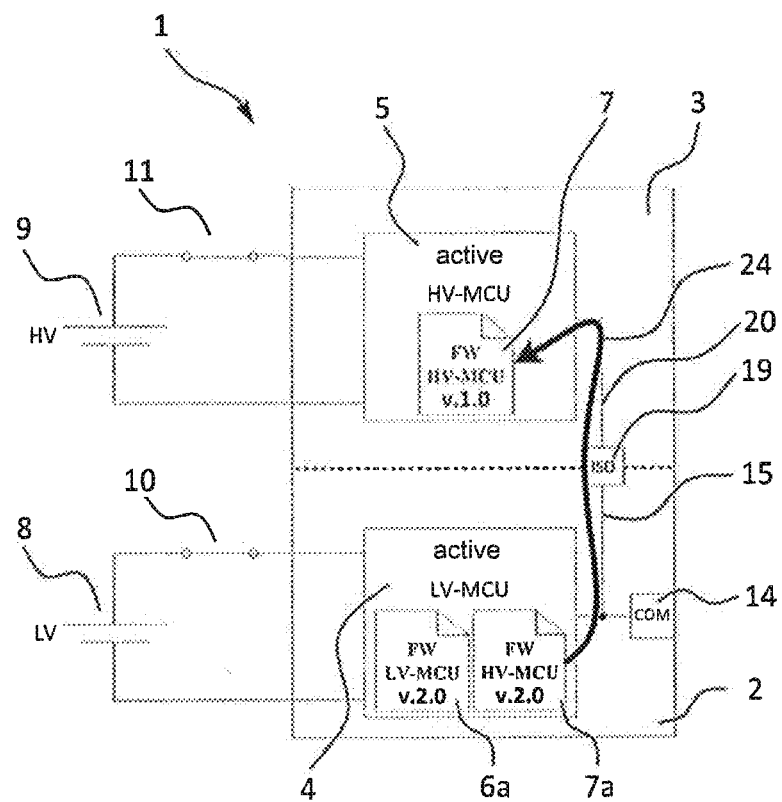
Figure 2D:
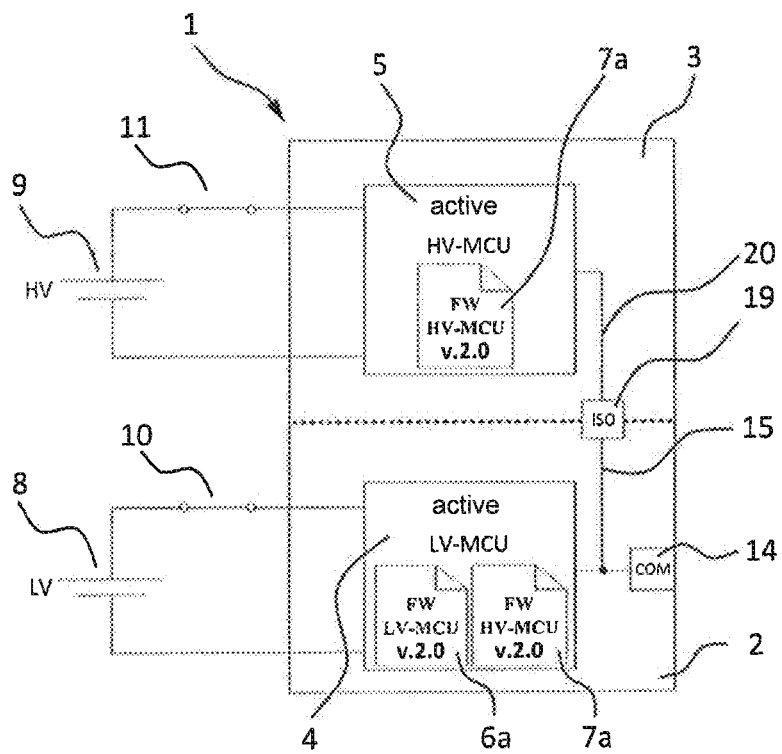
Figure 3:
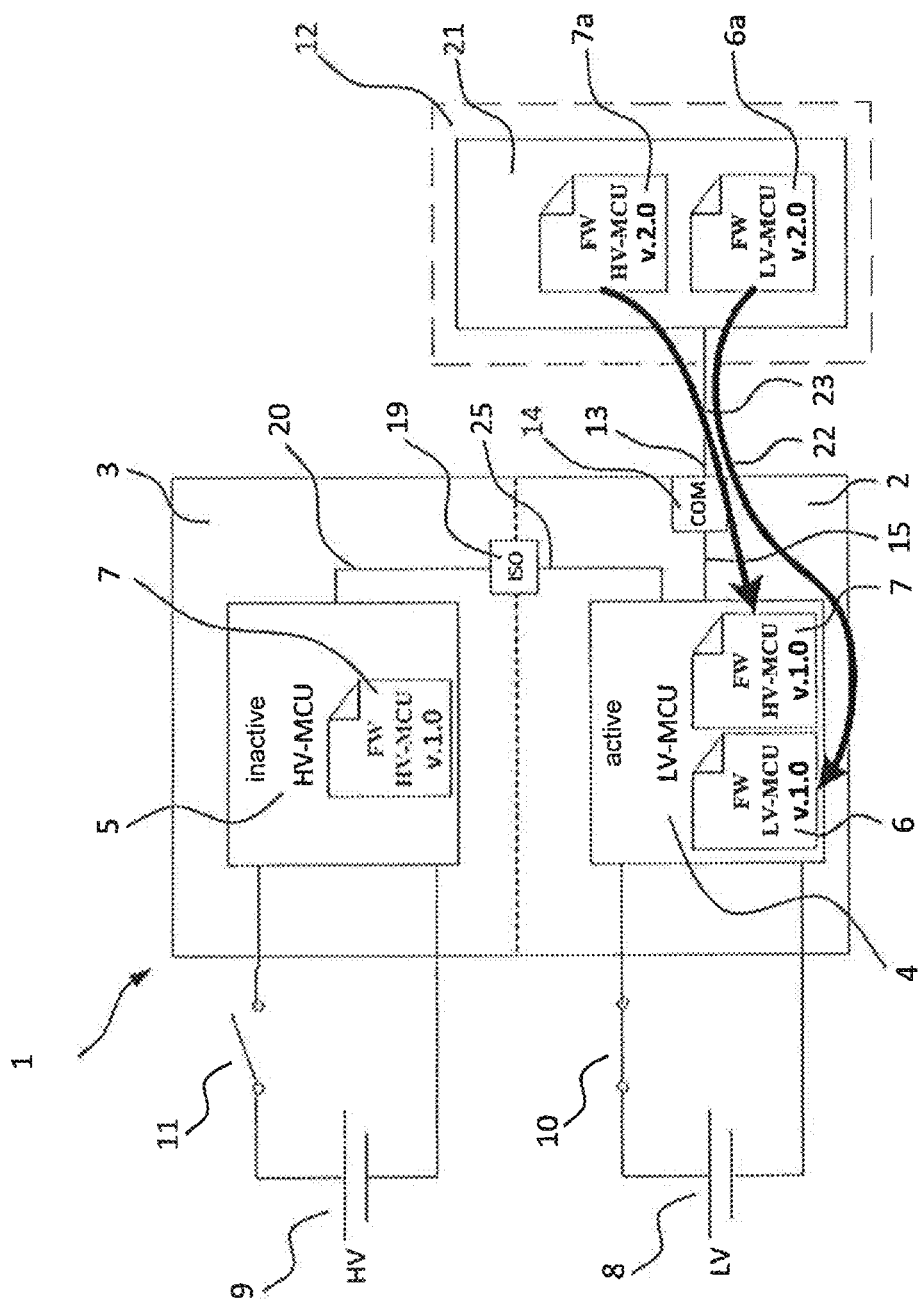

Further details, characteristics and advantages of implementations of the invention are evident based on the following description of embodiment examples with reference to the associated drawing. Therein depict:

FIG. 1: the circuitry of a high-voltage control device according to prior art, FIGS. 2*a* to 2*d*: the circuitry of a high-voltage control device in several different operational states for carrying out an update of the control software in both regions of the control device, and FIG. 3: an alternative embodiment of a high-voltage control device.

In FIG. 1 is shown the basic circuitry of a high-voltage control device 1' known in prior art. The high-voltage control device 1' is implemented in two parts and includes an LV region 2 and an HV region 3. Each region comprises its own control configuration 4, 5, for example a separate microcontroller. To the LV region 2 is assigned the first control configuration 4, also referred to as "Low Voltage Micro Controller Unit", or LV-MCU, and to the HV region 3 is assigned the second control configuration 5, also referred to as "High Voltage Micro Controller Unit" or abbreviated HV-MCU.

Within the first control configuration 4 depicted in FIG. 1 is depicted the current version of the first control software 6 controlling the first control configuration 4 with the label FW for firmware, LV-MCU for control software with the association with the first control configuration 4 and the current version number v.1.0. Analogously thereto, within the second control configuration 5 depicted in FIG. 1 is shown the current version of the second control software 7, controlling the second control configuration 5 with the label FW for firmware, HV-MCU for control software with the association with the second control configuration 5 and the current version number v.1.0.

FIG. 1 shows furthermore an LV power supply 8 connected to the LV region as well as an HV power supply 9, separate therefrom, connected to the HV region 3. To connect and disconnect the power supply, a first switch 10 is provided for the LV region 2 and a second switch 11 for the HV region 3. The switches 10, 11 call be switched manually or through a suitable control means and can be implemented as mechanical or electronic switches.

Further shown in FIG. 1 is an external unit 12, for example a personal computer, referred to as PC, or a laptop, which can be connected to the first control configuration 4 across a first communication line 13, a first communication interface 14 and a first internal communication line 15' of a first communication connection 22. Across the first communication connection 22 can be carried out, for example, an update of the first control software 6. Moreover, data for diagnostic purposes can be read out from the first control configuration 4. As the external unit 12 a diagnostic device or diagnostic tester can also be utilized.

The external unit 12 is furthermore connected to the second control configuration 5 across a second communication line 16, a second communication interface 17, a second internal communication line 18, a configuration for the galvanic isolation 19 and a third internal communication line 20 of a second communication connection 23. Across the second communication connection 23 can take place, for example, an update of the second control software 7. Moreover, for purposes of diagnosis data can also be read out from the second control configuration 5.

The external unit 12 comprises appropriate communication means 21, such as a flash tool, with which the establishment of the communication connections 22, 23 to the LV region 2 and/or to the HV region 3 can be realized as well as also the transmission of data across an established communication connection 22, 23.

In the example of FIG. 1 by means of the external unit 12 an update of the first control software 6 from version FW LV-MCU v.1.0 to version FW LV-MCU v.2.0 is to be carried out across the first communication connection 22. Furthermore, for example an update of the second control software 7 from version FW HV-MCU v.1.0 to version FW HV-MCU v.2.0 is to be carried out simultaneously across the second communication connection 23.

As depicted in FIG. 1 the LV region 2 is connected across the first switch 10 to the LV power supply 8 and consequently is switched on or active, while the HV region 3 is disconnected through the open second switch 11 from the HV power supply 9 and is consequently inactive or switched off.

In this state only an update of the first control software 6 from version FW LV-MCU v.1.0 to version FW LV-MCU v.2.0 can take place. A communication connection 23 of the external unit 12 with the second control configuration 5 cannot be established. The second control software 7 can consequently not be updated.

According to this known prior art, an update of the second control software 7 can also not be successfully completed in the case in which the second switch 11, during a currently proceeding update of the second control software 7 across the second communication connection 23, is open and consequently the HV power supply 9 is disconnected from the HV region 3.

In each of FIG. 2a to 2d is depicted the circuitry of a high-voltage control device 1 with an LV region 2 and an HV region 3 in different operational states for carrying out an update of the first control software 6 and of the second control software 7.

In contrast to FIG. 1, the high-voltage control device 1 shown in FIG. 2a, 2b, 2c, 2d comprises a connection between the first internal communication line 15 and the configuration for the galvanic isolation 19. Through the additional connection it is feasible to establish a third communication connection 24 between the first control configuration 4 of the LV region 2 and the second control configuration 5 of the HV region 3 and to transmit data between the control configurations 4, 5 across the third communication connection 24. This applies in particular also for the transmission of data for the update of the second control software 7 for the second control configuration 5.

The sequence of an update of the first control software 6 and the second control software 7 is depicted in four exemplary steps in FIGS. 2a to 2d.

FIG. 2a shows in a first step an operational state in which the LV region 2 is connected across the closed switch 10 to the LV region power supply 8 and consequently is switched on or active. The HV region 3 is simultaneously disconnected from the HV power supply 9 through the open switch 11 and is consequently switched off or inactive.

An external unit 12, such as a PC or a laptop, that is controlled via an appropriate control program with associated communication means 21, such as a flash tool, is connected across a conventional interface of the external unit 12 and the first communication line 13 to the first communication interface 14 of the high-voltage control device 1. The first communication interface 14 is connected within the high-voltage control device 1 across the first internal communication line 15 to the first control configuration 4 as well as also to the configuration for galvanic isolation 19. The first communication interface 14 is disposed in the LV region 2 of the high-voltage control device 1, which makes special measures for the safety of a connected external unit 12 or of the operating personnel unnecessary.

The depiction of FIG. 2a shows the second control configuration 5 with a second control software 7 in a version FW HV-MCU v.1.0, with which the second control configuration 5 is currently being operated. The depiction of FIG. 2a shows furthermore the first control configuration 4 with a first control software 6 in version FW LV-MCU v.1.0.

In the first control configuration 4, furthermore, also the second control software 7 in version FW HV-MCU v.1.0 is depicted, wherein the second control software 7 is stored besides the first control software 6 in a memory area of the first control configuration 4.

For an update of the first control software 6 and of the second control software 7 with a new first control software 6a and a new second control software 7a, that are provided on the external unit 12, a first communication connection 22 and a second communication connection 23 are established between the external unit 12 and the first control configuration 4 and the data of the new first control software 6a and of the new second control software 7a are transmitted into the memory areas within the first control configuration 4. Establishing the first communication connection 22 and the second communication connection 23 takes place across the first communication line 13, the first communication interface 14 and the first internal communication line 15.

FIG. 2b shows in a second step an operational state in which the new first control software 6a and the new second control software 7a have been transmitted into the memory area within the first control configuration 4. In the memory areas of the first control configuration 4 now the first control software 6a is stored in an updated version FW LV-MCU v.2.0 and the second control software 7a is stored in an updated version FW HV-MCU v.2.0.

Following the update of the control software of the high-voltage control device 1, the connection to the external unit 12 is terminated since the transmission of the current firmware to the high-voltage control device 1 is completed. FIG. 2b shows the high-voltage control device 1 continuing in the state in which the LV region 2 is switched active and the HV region 3 is switched inactive.

FIG. 2c shows in a third step an operational state in which the second switch 11 is closed. The voltage of the high-voltage power supply 9 is consequently applied to the HV region 3. The HV region 3 is now switched on or active.

It is herein provided that this status of activation or of the connection of the HV region 3 is automatedly detected by the first control configuration 4, which, for this reason, has available an appropriate algorithm within the first control software 6.

After the detection of the activation or of the connection of the HV region 3, across the first internal communication line 15, the configuration for the galvanic isolation 19 and the third internal communication line 20, a third communication connection 24 is established between the first control configuration 4 and the second control configuration 5. Across this third communication connection 24 the data for the update of the second control software 7 with the new second control software are transmitted. These data are stored in an appropriate memory area of the second control configuration 5 and subsequently control the operational sequence of the second control configuration 5. For this purpose an automatic or manual reset or new start of the high-voltage control device 1 or only of the HV region 3 can be provided after which the operational sequence of the high-voltage control device 1 is executed by means of the updated firmware comprising the first control software 6a and the second control software 7a.

The operational state in which the update of the first control software 6a with version FW LV-MCU v.2.0, stored in the first control configuration 4, and of the second control software 7a with version FW HV-MCU v.2.0, stored in the second control configuration, has been completed is depicted in FIG. 2d in a fourth step. Depicting the signals or a configuration for resetting or new starting one or several constituent parts of the high-voltage control device 1 has been forgone. At this point solutions known in prior art can be employed.

In FIG. 3 an alternative embodiment of the high-voltage control device 1 is shown in a first operational state in which the LV region 2 is connected to the LV power supply 8 across the closed switch 10 and consequently is switched on or active. The HV region 3 is simultaneously disconnected from the HV power supply 9 through the open switch 11 and is consequently switched off or inactive.

The arrangement according to FIG. 3 corresponds substantially to the arrangement described in FIG. 2a, for which reason the repeated description of the constituent parts of the high-voltage control device 1 is omitted here. In contrast to the arrangement of FIG. 2a, in the arrangement according to FIG. 3 the third communication connection 24, which in the depicted operational state is not yet established, is formed across a fourth internal communication connection 25, the configuration for galvanic isolation 19 and the third internal communication line 20.

The advantages of the described solution for updating the control software in a high-voltage control device 1 reside in particular therein that
- the updating of the control software 6,7 can take place independently of the operational state of the HV region 3 of the high-voltage control device 1,
- the danger through the high voltage of the HV region 3 to the maintenance personnel is reduced,
- there is no need for a communication connection to be established between an external unit 12 and the HV region 3 which, due to the requisite protective measures, such as galvanic isolation, is correspondingly complex and expensive,
- a decrease of the expenditures and complexity in the production of the circuit board for the high-voltage control device 1 is achieved since only one physical communication path for two communication connections 22, 23 has to be established,
- no special flash tool with high-voltage insulation is required, and
- an improvement of the operational and functional reliability is given due to the feasibility of checking the memory area or the memory content of the second control configuration 5 by the first control configuration 4, for example, by means of a checksum.

LIST OF REFERENCE NUMBERS 1, 1' High-voltage control device (ECU) [Electronic Control Unit] Low-voltage [LV] region
2 High-voltage [HV] region
4 First [LV] control configuration (LV-MCU) [Micro-Control Unit]
5 Second [HV] control configuration (HV-MCU) [Micro-Control Unit]
6, 6a First [LV] control software (Firmware/FW LV-MCU)
7, 7a Second [HV] control software (Firmware/FW HV-MCU)
8 Low-voltage power supply (LV)
9 High-voltage power supply (HV)
10 First switch
11 Second switch
12 External unit
13 First communication line
14 First communication interface (COM) [COMmunication]
15, 15' First internal communication line
16 Second communication line
17 Second communication interface (COM)
18 Second internal communication line
19 Configuration for galvanic isolation (ISO) [ISOlation]
20 Third internal communication line
21 Communication means (Flash Tool)
22 First communication connection
23 Second communication connection
24 Third communication connection
25 Fourth internal communication line

The invention claimed is:

1. A method for updating a control software in a high-voltage control device, wherein, for updating the control software for a first control configuration, a new first control software is provided and for updating the control software for a second control configuration a new second control software is provided and wherein a transmission of the new control software into memory areas of the control configurations is carried out,
wherein in the case that the second control configuration is in a switched-off state, in a first step a transmission of the new first control software and the new second control software into a memory area of the first control configuration takes place, in which memory area the new first control software and the new second control software is stored,
wherein in a subsequent step, after it has been detected by means of the first control configuration that the second control configuration has moved into a switched-on state, a transmission of the new second control software, stored in the memory area of the first control configuration, into a memory area of the second control configuration takes place;
wherein the first control configuration includes a first memory area for storing a second control software for the second control configuration and a first control software, and
wherein the second control configuration includes a second memory area for storing the second control software for the second control configuration.

2. A method according to claim 1, wherein after the transmission of the new second control software into a memory area of the second control configuration, the first control software is overwritten with the new first control software and the second control software is overwritten with the new second control software and that the first control configuration and the second control configuration are subsequently operated with the updated control software.

3. A method according to claim 2, wherein the transmission of the new second control software from the memory area of the first control configuration into the memory area of the second control configuration takes place across a third communication connection.

4. A method according to claim 2, wherein a check of the correct transmission of the data of the new second control software into the memory area of the second control configuration takes place using a checksum.

5. A method according to claim 1, wherein the transmission of the new second control software from the memory area of the first control configuration into the memory area of the second control configuration takes place across a third communication connection.

6. A method according to claim 5, wherein a check of the correct transmission of the data of the new second control software into the memory area of the second control configuration takes place using a checksum.

7. A method according to claim 1, wherein a check of the correct transmission of the data of the new second control software into the memory area of the second control configuration takes place using a checksum.

8. A method according to claim 1, wherein the high-voltage control device is in a motor vehicle.

* * * * *